(12) United States Patent
Chang et al.

(10) Patent No.: US 6,942,388 B2
(45) Date of Patent: Sep. 13, 2005

(54) BEARING STRUCTURE

(75) Inventors: Chin-Hung Chang, Tu-Chen (TW); Yu-Cheng Chou, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 156 days.

(21) Appl. No.: 10/191,589

(22) Filed: Jul. 8, 2002

(65) Prior Publication Data

US 2003/0219179 A1 Nov. 27, 2003

(30) Foreign Application Priority Data

May 24, 2002 (TW) ........................................ 91207530 U

(51) Int. Cl.[7] .............................................. F16C 33/24
(52) U.S. Cl. ...................... 384/279; 384/295; 384/902
(58) Field of Search ............................... 384/279, 295, 384/297, 902, 907.1

(56) References Cited

U.S. PATENT DOCUMENTS

| | | | | |
|---|---|---|---|---|
| 3,352,612 A | * | 11/1967 | Eudier | ........................ 384/279 |
| 4,371,220 A | * | 2/1983 | Brucher | ....................... 384/371 |
| 4,753,326 A | * | 6/1988 | Weiler et al. | ............ 188/73.44 |
| 5,028,148 A | * | 7/1991 | Kanamaru et al. | ............. 384/12 |
| 5,083,873 A | * | 1/1992 | Momose et al. | ............. 384/280 |
| 5,762,423 A | * | 6/1998 | Mori et al. | .................. 384/279 |
| 5,895,119 A | * | 4/1999 | Miyasaka et al. | ........... 384/279 |
| 6,082,903 A | * | 7/2000 | Saneshige | .................... 384/279 |
| 6,338,575 B1 | * | 1/2002 | Chen | .......................... 384/279 |

FOREIGN PATENT DOCUMENTS

| | | | |
|---|---|---|---|
| DE | 2 101 262 | * | 7/1972 |
| JP | 5-71539 | * | 3/1993 |
| JP | 8-49723 | * | 2/1996 |

* cited by examiner

Primary Examiner—William C Joyce
(74) Attorney, Agent, or Firm—Wei Te Chung

(57) ABSTRACT

A bearing structure includes a cylindrical first member (10), and a second member (20) received in the first member. The first member is made of ceramic sintered material. The first member defines a first axle hole (11), and the first axle hole has a first radius. A chamber (12) is transversely defined through a middle portion of the first member, the chamber receiving the second member therein. The second member is made of metallic sintered material. The second member defines a second axle hole (21), and the second axle hole has a second radius. The first radius of the first axle hole is less than the second radius of the second axle hole. A shaft (30) is rotatably received in the first and second axle holes. When the shaft deviates from a central axis of rotation, the shaft only contacts the first member at the first axle hole.

14 Claims, 3 Drawing Sheets

BEARING STRUCTURE

BACKGROUND OF THE INVENTION

1. Field of the Invention

The present invention relates to bearing structures such as those used in fan motor assemblies, and particularly to a bearing structure which comprises a first member and a second member where a material of the first member is different from a material of the second member.

2. Description of Prior Art

Sliding bearings are widely used in fan motor bearing assemblies mainly because of their low cost. A sliding bearing is mostly made of metallic sintered material or ceramic sintered material. A typical metallic bearing has many open pores on its surface suitable for holding lubricating oil therein. Therefore the metallic bearing can provide good lubrication. However, the metallic bearing is prone to wear out after continued use. FIG. 4 illustrates a conventional metallic bearing accommodating a shaft therein. FIGS. 5A and 5B illustrate typical situations when the shaft rotates at high speed in the bearing. The shaft deviates from a central axis of rotation, and contacts the bearing. Thus the bearing is easily worn out, and a lifespan of the bearing is reduced. In contrast, a typical ceramic bearing is highly resistant to friction wear. Nevertheless, a surface of the ceramic bearing has poor capability for holding lubricating oil therein. When the ceramic bearing operates with only a little lubrication, it is also easily worn out. In addition, increased friction during operation results in increased vibration.

U.S. Pat. No. 5,997,265 discloses an improved bearing structure. An annular groove is defined in an inner surface of a bearing of the bearing structure. The groove gives the bearing increased oil holding capacity, reduces friction between a shaft and the bearing, and extends a lifespan of the bearing structure. U.S. Pat. No. 5,927,859 discloses a bearing structure defining a through hole, a cavity and a plurality of slots in communication with the cavity. A shaft disposed in the through hole forms two sets of threads that spiral in opposite directions. When the shaft rotates, grease is forced along the threads such that it circulates through the cavity, the slots and the through hole. However, both the above-disclosed bearing structures require extra structures to be added to the bearing. Manufacturing of the bearing is more complicated, and costs of the bearing structure are increased.

Thus, an improved bearing structure which overcomes the above-mentioned problems is desired.

SUMMARY OF THE INVENTION

Accordingly, an object of the present invention is to provide a low-cost bearing structure having a simple configuration which can effectively extend a lifespan of a bearing.

In order to achieve the above object, a bearing structure in accordance with a preferred embodiment of the present invention comprises a cylindrical first member, and a second member received in the first member. The first member is made of ceramic sintered material. The first member defines a first axle hole, and the first axle hole has a first radius. A chamber is transversely defined through a middle portion of the first member, the chamber receiving the second member therein. The second member is made of metallic sintered material. The second member defines a second axle hole, and the second axle hole has a second radius. The first radius of the first axle hole is less than the second radius of the second axle hole. A shaft is rotatably received in the first and second axle holes. When the shaft deviates from a central axis of rotation, the shaft only contacts the first member at the first axle hole.

Other objects, advantages and novel features of the present invention will become more apparent from the following detailed description when taken in conjunction with the accompanying drawings, in which:

DETAILED DESCRIPTION OF THE PREFERRED EMBODIMENTS

Figure 1:
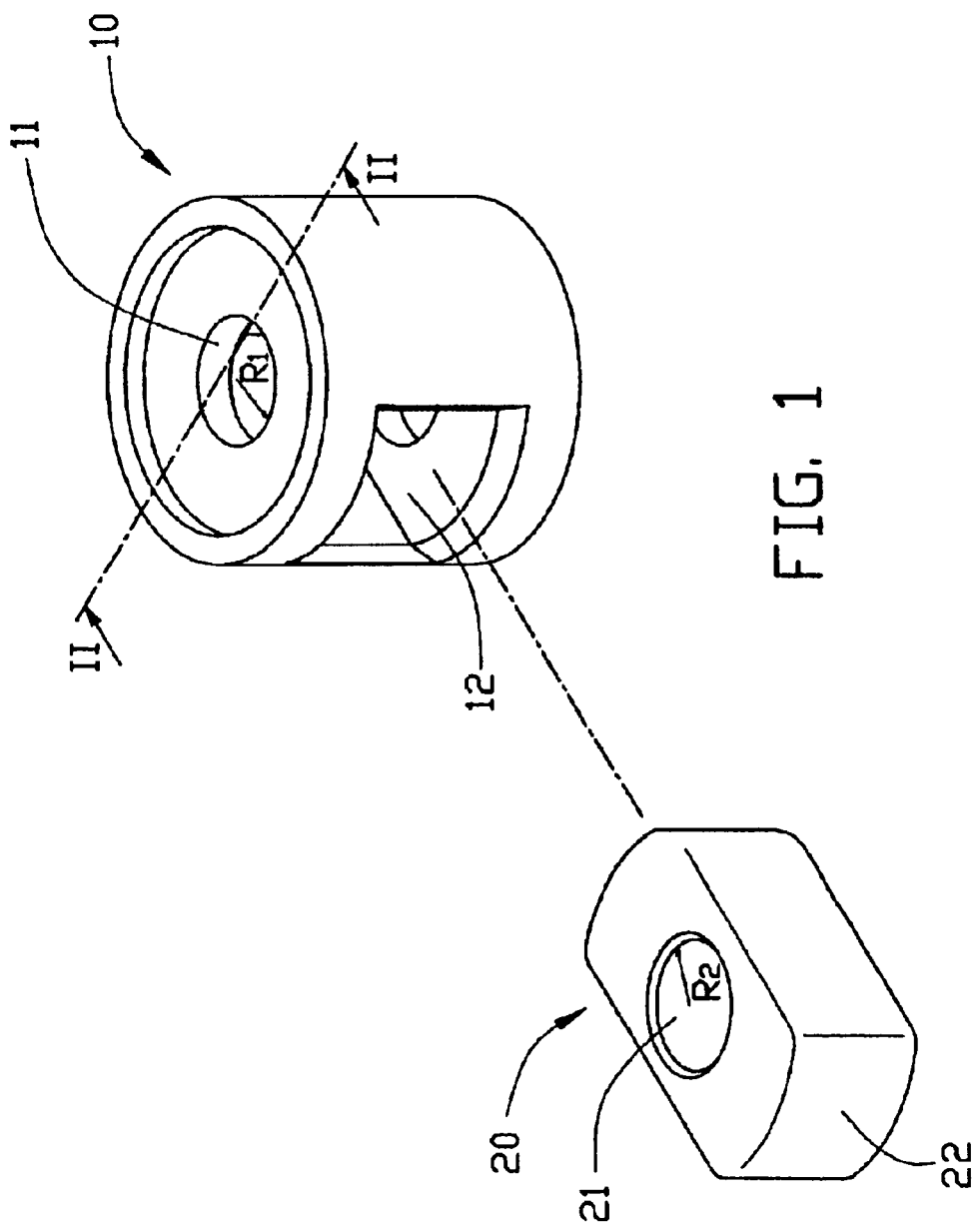
FIG. 1 is an exploded isometric view of a bearing structure in accordance with a preferred embodiment of the present invention.
Figure 2:
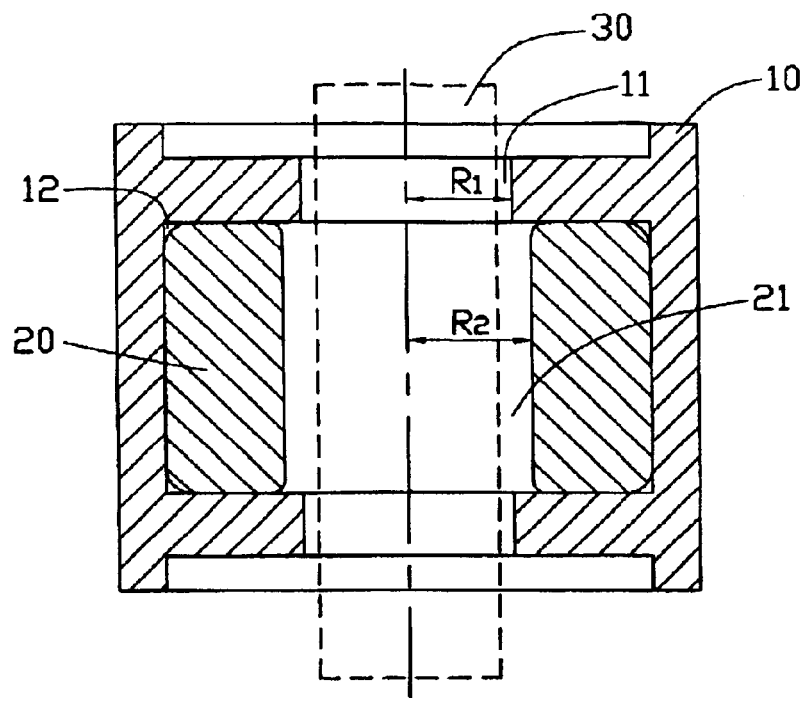
FIG. 2 is a cross-sectional view of the bearing structure of FIG. 1 fully assembled, taken along line II—II of FIG. 1 and schematically showing a shaft received in the bearing structure.

Referring to FIGS. 1 and 2, a bearing structure in accordance with a preferred embodiment of the present invention comprises a cylindrical first member 10, and a second member 20 received in the first member 10.

The first member 10 is made of ceramic sintered material such as alumina ($Al_2O_3$), Zirconia (ZrO), or silicon nitride ($Si_3N_4$). The first member 10 defines a first axle hole 11 therethrough, and the first axle hole 11 has a first radius $R_1$. A chamber 12 is transversely defined through a middle portion of the first member 10, for accommodating the second member 20 therein. The first axle hole 11 is in communication with the chamber 12.

The second member 20 is made of metallic sintered material such as iron-based alloy powder or bronze-based alloy powder. The second member 20 is fittingly received in the chamber 12 of the first member 10. The second member 20 defines a second axle hole 21, and the second axle hole 21 has a second radius $R_2$. The second radius $R_2$ of the second axle hole 21 is greater than the first radius $R_1$ of the first axle hole 11. The second member 20 comprises two opposite curved ends 22. A radius of each curved end 22 is equal to a radius of the first member 10.

In assembly, the second member 20 is inserted into the chamber 12 of the first member 10. The second axle hole 21 of the second member 20 is axially aligned with the first axle hole 11 of the first member 10. The curved ends 22 of the second member 20 are flush with an outer circumferential surface of the first member 10. The combined first member 10 and the second member 20 is fittingly placed in a bearing sleeve (not shown), for preventing the second member 20 from dropping out from the chamber 12 of the first member 10. A shaft 30 is extended through the first and second axle holes 11, 21, and is rotatable therein.

In operation, the shaft 30 rotates at high speed in the first and second axle holes 11, 21. When the shaft 30 deviates from a central axis of rotation, the shaft 30 only contacts the first member 10 at the first axle hole 11 because the radius $R_1$ is less than the radius $R_2$. Since the first member 10 is made of ceramic sintered material, it has high frictional resistance and a low coefficient of friction. Therefore abrasion between the shaft 30 and the first member 10 is greatly reduced. The shaft 30 does not contact the second member 20. Because the second member 20 is made of metallic sintered material, it has many open pores on its surface suitable for holding lubricating oil therein. This enhances lubrication of the bearing structure. A working lifespan of the first member 10 is extended due to the enhanced lubrication characteristics of the second member 20. Thus, a working lifetime of the bearing structure is greatly extended.

Figure 3:
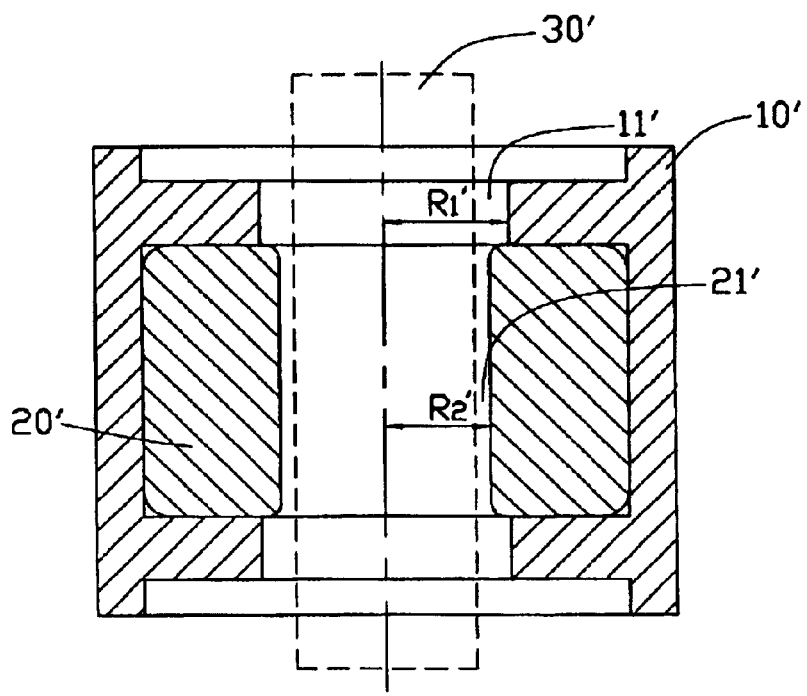
FIG. 3 is similar to FIG. 2, but showing a bearing structure in accordance with an alternative embodiment of the present invention.
Figure 4:
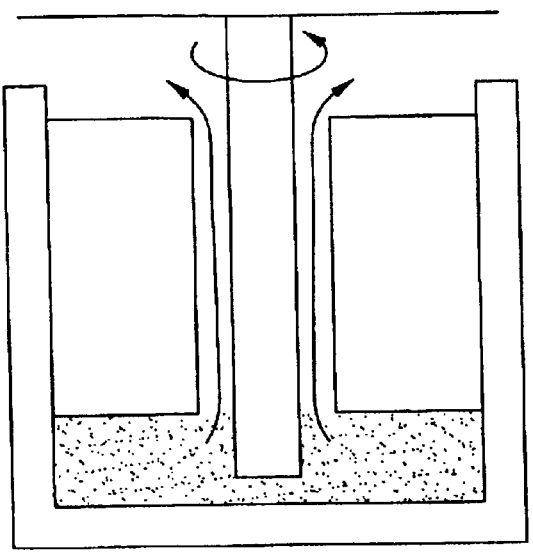
FIG. 4 is a schematic cross-sectional illustration of a conventional bearing structure.
Figure 5A:
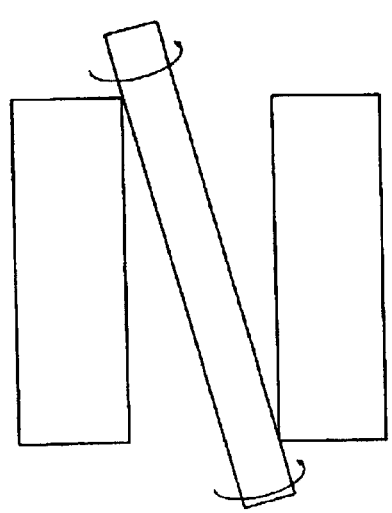
FIGS. 5A and 5B are schematic cross-sectional illustrations of the bearing structure of FIG. 4 in operation.
Figure 5B:
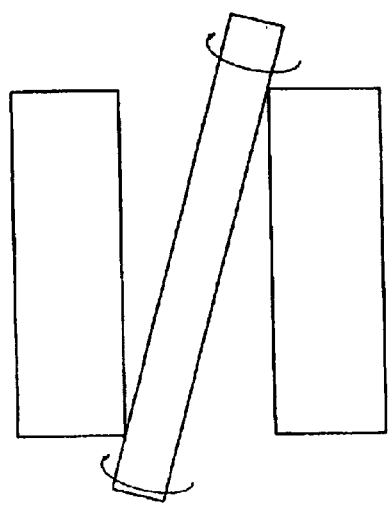

FIG. 3 shows a bearing structure in accordance with an alternative embodiment of the present invention. The bearing structure is similar to the bearing structure of the preferred embodiment, except for the following matters. A cylindrical first member 10' is made of metallic sintered material. A second member 20' is made of ceramic sintered material. The first member 10' defines a first axle hole 11' having a first radius $R_1'$. The second member 20 defines a second axle hole 21' having a second radius $R_2'$. The first radius $R_1'$ of the first axle hole 11' is greater than the second radius $R_2'$ of the second axle hole 21'. A shaft 30' is extended through the first and second axle holes 11', 21', and is rotatable therein.

Assembly of the bearing structure of the alternative embodiment is similar to assembly of the bearing structure of the preferred embodiment. Reference is made to the above detailed description of assembly of the bearing structure of the preferred embodiment, with due alteration of details.

In operation, a shaft 30' rotates at high speed in the first and second axle holes 11', 21'. When the shaft 30' deviates from a central axis of rotation, the shaft 30' firstly contacts the second member 20' at the second axle hole 21' because the second radius $R_2$ is less than the first radius $R_1$. Since the second member 20' is made of ceramic sintered material, it has high frictional resistance and a low coefficient of friction. Therefore abrasion between the shaft 30' and the second member 20' is greatly reduced. The shaft 30' does not contact the first member 10'. Because the first member 10' is made of metallic sintered material, it has many open pores on its surface suitable for holding lubricating oil therein. This enhances lubrication of the bearing structure. A working lifespan of the second member 20' is extended due to the enhanced lubrication characteristics of the first member 10'. Thus, a working lifetime of the bearing structure is greatly extended.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A bearing structure, comprising:
   a first member comprising a first material, the first member defining a chamber and a first hole in communication with the chamber, the chamber being transversely defined through a middle portion of the first member, the first hole having a first radius and being adapted for extension of a shaft therethrough; and
   a second member received in the chamber of the first member, the second member comprising a second material, the second member defining a second hole, the second hole having a second radius and being adapted for extension of the shaft therethrough.

2. The bearing structure as described in claim 1, wherein the first material of the first member comprises ceramic sintered material, and the second material of the second member comprises metallic sintered material.

3. The bearing structure as described in claim 2, wherein the first radius of the first hole of the first member is less than the second radius of the second hole of the second member.

4. The bearing structure as described in claim 1, wherein the first material of the first member comprises metallic sintered material, and the second material of the second member comprises ceramic sintered material.

5. The bearing structure as described in claim 4, wherein the first radius of the first hole of the first member is greater than the second radius of the second hole of the second member.

6. The bearing structure as described in claim 1, wherein the first member is generally cylindrical.

7. The bearing structure as described in claim 6, wherein the second member further comprises two opposite curved ends.

8. The bearing structure as described in claim 7, wherein a radius of each of the curved ends is substantially equal to a radius of the first member.

9. A bearing structure for rotatably supporting a shaft comprising:
   first and second members commonly defining an axial dimension thereof,
   said first member being characterized with a low coefficient of friction and a high frictional resistance and defining a first axial hole therein, and
   said second member being characterized with a plurality of open pores on an exterior surface to hold lubricating oil therein and defining a second axial hole therein; wherein
   said first axial hole is smaller than the second axial hole in diameter so that only said first member contacts the shaft, and said first member and said second member are immoveable with regard to each other axially, and wherein one of said first member and said second member defines two opposed inner surfaces to sandwich the other of said first member and said second member therebetween in the axial direction so as to prevent axial movement of said other.

10. In combination,
    a bearing structure including first and second members,
    said first member being characterized with a low coefficient of friction and a high fictional resistance and defining therein a first axial hole with a first inner diameter thereof; and
    said second member being characterized with a plurality of open pores on an exterior surface to hold lubricating oil therein and defining therein a second axial hole with thereof a second inner diameter being larger than the first inner diameter; and
    a shaft rotatably extending through said bearing structure and defining an outer diameter closer to said first inner diameter than to said second inner diameter; wherein
    one of said first and second members defines a chamber to receive the other therein, and said chamber extends through said one of the first and second members in one radial direction to allow the other to enter said chamber radially.

11. The combination as described in claim 10, wherein said first axial hole and said second axial hole successively and directly confront the shaft along an axial direction of said shaft.

12. The combination as described in claim 10, wherein said first member and said second member are immoveable to each other.

13. The combination as described in claim 10, wherein an outer portion of the other is compliantly curvedly flush with an outer circumferential surface of said one of the first and second members.

14. The combination as described in claim 10, wherein said one is the first member.

* * * * *